(12) United States Patent
Simonetti et al.

(10) Patent No.: US 12,155,666 B2
(45) Date of Patent: Nov. 26, 2024

(54) EVALUATION OF EFFECTIVE ACCESS PERMISSIONS IN IDENTITY AND ACCESS MANAGEMENT (IAM) SYSTEMS

(71) Applicant: Capital One Services, LLC, McLean, VA (US)

(72) Inventors: James Simonetti, Ashburn, VA (US); Britton Lee, Arlington, VA (US); Joseph Chen, Falls Church, VA (US); John Valin, Park Ridge, IL (US); Anika Gera, Dallas, TX (US); Nicholas Mirallegro, Arlington, VA (US); Jessica Feinstein, Arlington, VA (US); Nicholas Kotakis, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 335 days.

(21) Appl. No.: 17/333,469

(22) Filed: May 28, 2021

(65) Prior Publication Data
US 2022/0385668 A1 Dec. 1, 2022

(51) Int. Cl.
*H04L 9/40* (2022.01)

(52) U.S. Cl.
CPC .......... *H04L 63/102* (2013.01); *H04L 63/101* (2013.01); *H04L 63/20* (2013.01)

(58) Field of Classification Search
CPC ...... H04L 63/102; H04L 63/101; H04L 63/20
See application file for complete search history.

(56) References Cited

U.S. PATENT DOCUMENTS

| 7,171,459 B2 | 1/2007 | Sanghvi et al. |
| 9,916,450 B2 | 3/2018 | Moloian et al. |

(Continued)

FOREIGN PATENT DOCUMENTS

| CN | 109829314 A | 5/2019 |
| WO | 2019244036 A1 | 12/2019 |

OTHER PUBLICATIONS

International Search Report and Written Opinion of the International Searching Authority directed to related International Patent Application No. PCT/US22/31390, mailed Aug. 25, 2022; 7 pages.

(Continued)

*Primary Examiner* — Matthew Smithers
*Assistant Examiner* — Shu Chun Gao
(74) *Attorney, Agent, or Firm* — Sterne, Kessler, Goldstein & Fox P.L.L.C.

(57) ABSTRACT

Disclosed herein are system, method, and computer program product embodiments for generating a list of deny policy statements associated with an allow policy statement with respect to the effective access permissions for a principal in an identity and access management system. The operations can include identifying a first policy statement that specifies members of a first identity set including the principal are allowed to access a first system resource set. The operations further include identifying a second policy statement specifying that members of a second identity set are denied access to a second system resource set. Moreover, the operations include determining that the second policy statement overlaps with the first policy statement with respect to the effective access permissions for the principal, and placing the second policy statement into the list of deny policy statements associated with an allow policy statement.

20 Claims, 8 Drawing Sheets

(56) References Cited

U.S. PATENT DOCUMENTS

| | | | |
|---|---|---|---|
| 10,021,138 B2 | 7/2018 | Gill et al. | |
| 10,122,757 B1* | 11/2018 | Kruse | H04L 63/10 |
| 10,148,701 B1 | 12/2018 | Hecht et al. | |
| 10,225,152 B1 | 3/2019 | Roth et al. | |
| 10,430,606 B1 | 10/2019 | Levit et al. | |
| 10,664,312 B2 | 5/2020 | Moloian et al. | |
| 10,749,886 B1 | 8/2020 | Kandel et al. | |
| 10,754,506 B1 | 8/2020 | Moyal et al. | |
| 10,803,169 B1 | 10/2020 | Flatten et al. | |
| 10,944,561 B1 | 3/2021 | Cahill et al. | |
| 10,965,686 B1 | 3/2021 | Agarwwal et al. | |
| 11,206,269 B1 | 12/2021 | Van Deman | |
| 11,368,492 B1 | 6/2022 | Engers et al. | |
| 2004/0078391 A1 | 4/2004 | Excoffier et al. | |
| 2007/0043771 A1 | 2/2007 | Ludwig et al. | |
| 2007/0073671 A1 | 3/2007 | McVeigh et al. | |
| 2008/0016580 A1 | 1/2008 | Dixit et al. | |
| 2012/0150912 A1 | 6/2012 | Ripberger | |
| 2013/0329738 A1 | 12/2013 | Yamagata et al. | |
| 2015/0026215 A1 | 1/2015 | Goel et al. | |
| 2015/0135257 A1* | 5/2015 | Shah | H04L 63/105 726/1 |
| 2017/0034075 A1 | 2/2017 | Burk et al. | |
| 2017/0329957 A1* | 11/2017 | Vepa | G06F 21/445 |
| 2018/0084012 A1* | 3/2018 | Joseph | H04L 63/108 |
| 2018/0288063 A1* | 10/2018 | Koottayi | G06F 21/50 |
| 2019/0007418 A1* | 1/2019 | Cook | H04N 21/443 |
| 2019/0007443 A1* | 1/2019 | Cook | H04L 63/20 |
| 2019/0073488 A1 | 3/2019 | Kruse et al. | |
| 2019/0236062 A1 | 8/2019 | Proctor et al. | |
| 2019/0327271 A1 | 10/2019 | Saxena et al. | |
| 2019/0362087 A1 | 11/2019 | Ferrans et al. | |
| 2020/0007677 A1 | 1/2020 | Bjontegard | |
| 2020/0076812 A1 | 3/2020 | Spurlock et al. | |
| 2020/0120098 A1 | 4/2020 | Berg et al. | |
| 2020/0137097 A1 | 4/2020 | Zimmermann et al. | |
| 2020/0336489 A1 | 10/2020 | Wuest et al. | |
| 2020/0358778 A1 | 11/2020 | Gopinathapai et al. | |
| 2021/0182423 A1 | 6/2021 | Padmanabhan | |
| 2022/0335148 A1 | 10/2022 | Gandhi et al. | |

OTHER PUBLICATIONS

SDNShield: Reconciliating Configurable Application Permissions for SDN App Markets. Wen. IEEE. (Year: 2016).

ASCAA: API-level security certification of android applications. Pei. IET Software. (Year: 2017).

PoLPer: Process-Aware Restriction of Over-Privileged Setuid Calls in Legacy Applications. Jeon. ACM. (Year: 2019).

* cited by examiner

EVALUATION OF EFFECTIVE ACCESS PERMISSIONS IN IDENTITY AND ACCESS MANAGEMENT (IAM) SYSTEMS

BACKGROUND

Computer applications often have to provide access control (AC) to system resources. AC is concerned with determining the allowed activities of legitimate users, roles, or principals, mediating every request to access a system resource in the system. Identity and access management (IAM) is a framework of business processes, policies and technologies that facilitates the management of electronic or digital identities of principals and system resources.

With an IAM framework in place, information technology managers can manage AC to information or system resources within their organizations. IAM systems can be deployed on premises, provided by a third-party vendor through a cloud-based subscription model, or deployed in a hybrid model. An IAM system can evaluate whether a user, a role, or a principal can access a system resource protected by the IAM system on a per-request basis. An IAM system can receive a request to access a system resource. The IAM system can evaluate whether to allow or deny the requested access to the system resource based on a set of security policies assigned to the user, the role, or the principal.

For security purposes, it is important to have the right security policies so that an IAM system can grant a principal access only to the system resources the principal is supposed to access. Accordingly, approaches are needed to ensure that the IAM system is limiting access appropriately.

BRIEF SUMMARY

Disclosed herein are system, apparatus, device, method and/or computer program product embodiments, and/or combinations and sub-combinations thereof for evaluating effective access permissions defined by a set of security policies for a principal, where the principal can be an identity and access management (IAM) user, an IAM role, or an application. A security policy can include multiple policy statements. Hence, there can be many security policy statements associated with a principal in an IAM system. Some policy statements may allow access to a system resource set of the IAM system, while some other policy statements may deny access to a system resource set of the IAM system. The effective access permissions for the principal is the overall access permissions defined by all the policy statements of the entire set of security policies. In order to evaluate the effective access permissions for a principal, embodiments herein classify the policy statements of the security policies into a set of allow policy statements, and a set of deny policy statements. The set of allow policy statements includes policy statements that specify that members of an identity set including the principal are allowed to access a system resource set of the IAM system. The set of deny policy statements includes policy statements that specify that members of an identity set are denied access to a system resource set of the IAM system. For an allow policy statement of the set of allow policy statements, embodiments determine a list of deny policy statements associated with the allow policy statement with respect to the effective access permissions. A deny policy statement is included in the list of deny policy statements associated with the allow policy statement when there is a shared system resource belonging to the system resource set of the allow policy statement and the system resource set of the deny policy statement, and the identity set of the deny policy statement includes the principal. The effective access permissions associated with the principal are defined by a system resource included in the system resource set of the allow policy statement but not included in the system resource set of the deny policy statement.

In some examples, a computer-implemented method is presented for evaluating effective access permissions defined by security policies associated with a principal managed by an IAM system. The method includes identifying a first policy statement associated with the principal, and identifying a second policy statement. The first policy statement specifies that members of a first identity set including the principal are allowed to access a first system resource set of the IAM system, while the second policy statement specifies that members of a second identity set are denied access to a second system resource set of the IAM system. The method further includes determining whether or not there is a shared system resource belonging to both the first system resource set and the second system resource set, and whether or not the second identity set includes the principal. When the shared system resource belongs to the first system resource set and the second system resource set, and the second identity set includes the principal, the method includes determining that the second policy statement overlaps with the first policy statement with respect to the effective access permissions for the principal. The effective access permissions associated with the principal are defined by a system resource included in the first system resource set but not included in the second system resource set. The method further includes placing, when the second policy statement is determined to overlap with the first policy statement, the second policy statement into a list of policy statements associated with the first policy statement with respect to the effective access permissions.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
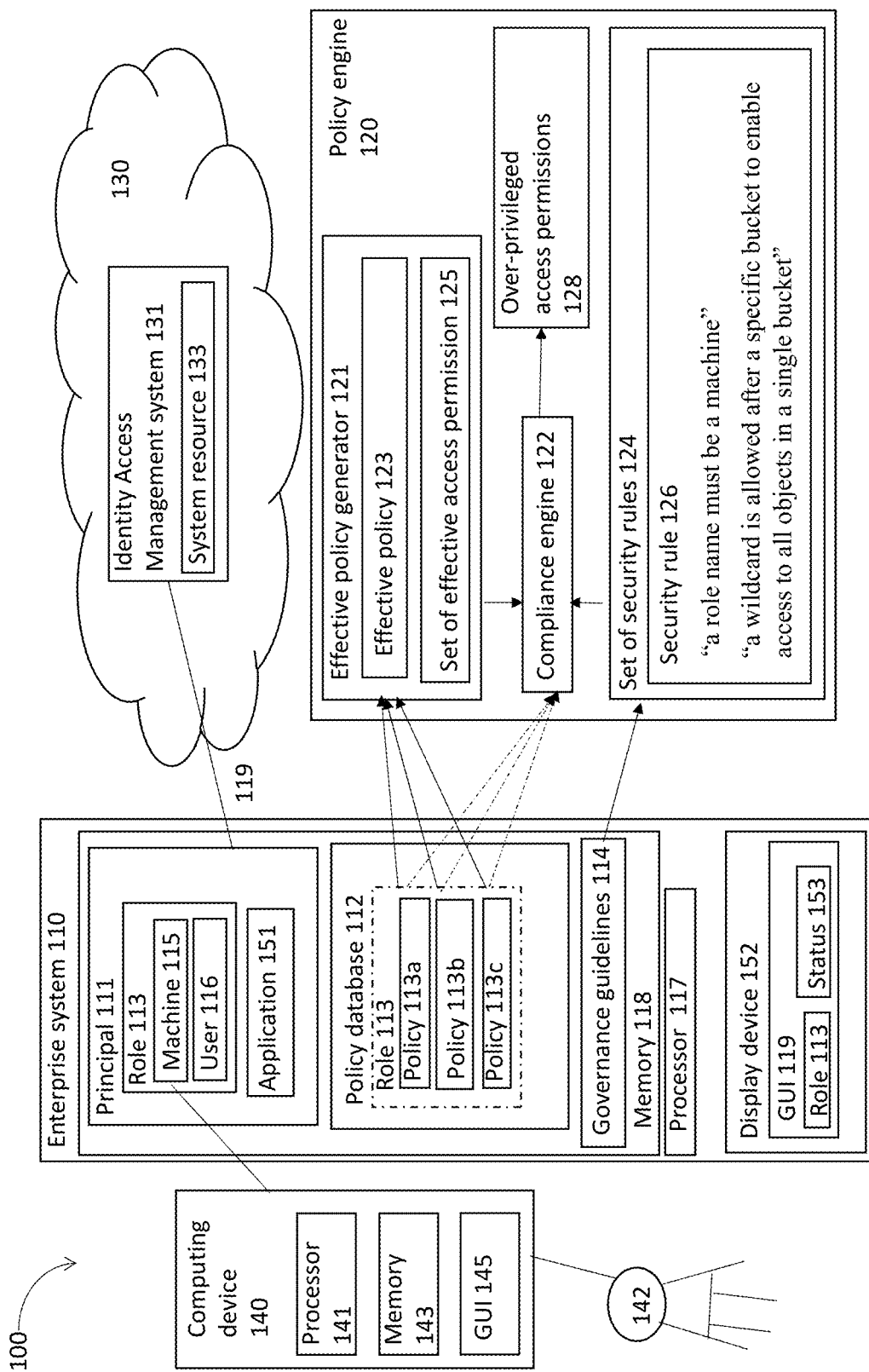
FIG. 1 is a block diagram of an environment for evaluating effective access permissions defined by a set of security policies associated with a principal in an identity and access management (IAM) system, according to some embodiments.

Identity and access management (IAM) is a framework of business processes, policies, and technologies that facilitates the management of electronic or digital identities of users, roles, or principals, and system resources. A principal can include an IAM user, an IAM role, or an application. In the following, a role can be used as an example of a principal. Descriptions about a role can be applicable to a principal.

IAM systems can provide access control to system resources by a principal on a per-request basis. In general, an IAM system can grant or deny a request from a principal to access system resources based on access permissions assigned to the principal by one or more security policies. Such a request can be received from an enterprise system, and the request can identify the principal. The following discussion presents interactions between an IAM system and an enterprise system but one skilled in the art would understand that the interactions apply to any requesting system that seeks access to a system resource based on access controls. The requesting system is therefore not limited to an enterprise system but any system that uses principals and permissions as part of access control to the system resource. A request for access can be granted or allowed, which are used interchangeably in the current description.

The request-response dynamic between the IAM system and an enterprise system presents challenges to the requesting system. First, the requesting system is not informed of any potential issues with respect to principals in its system until a request is made to the IAM system. Any corrective action to its principals is therefore reactive and presents a potential security concern because principals are not evaluated until a request is made. This provides an opportunity for compromised and/or over-privileged principals (e.g., by a hacker) to be hijacked and used to improperly gain access to system resources. Second, the requesting system relies on the IAM system in determining whether its principals are compliant with permission controls for accessing system resources.

The features described in this disclosure allow for an enterprise system to monitor access permission compliance of principals with access control (AC) for accessing system resources of an IAM system without any requests being made. Access privileges or permissions to system resources by a principal are granted according to security policies. There are many kinds of security policies, which work together to provide effective access permissions for a principal to access system resources. However, due to the complexity of many security policies, sometimes a principal can have an unintended, improper, or over-privileged access permission to some system resources for which the principal should not have access to. For security reasons, it is important to prevent a principal from having an over-privileged access permission to system resources. In some embodiments, the enterprise system can detect over-privileged access permissions because the operations are performed by the enterprise system independent of the IAM system. Accordingly, the mechanisms discussed in the current disclosure are implemented by a machine with a specific arrangement, where the policy engine is separated from the IAM system to provide more security protection for the IAM system. In some embodiments, the enterprise system detecting over-privileged access permissions is separated from the IAM system.

In some examples, an over-privileged access permission is detected by comparing permissible scopes of access permissions defined by a set of security rules with a set of effective access permissions defined by a set of security policies associated with the principal. Based on the set of effective access permissions, an enterprise system can perform preemptive evaluation of access permissions associated with a principal to identify any over-privileged access permission of the principal to system resources. Hence, the enterprise system can detect over-privileged access permissions associated with a principal in an IAM system without having to submit any requests to the IAM system.

Accordingly, in order to identify any over-privileged access permission, it is important to determine the effective access permissions defined by security policies associated with the principal managed by the IAM system. When the number of security policies associated with a principal can be in the magnitude of hundreds of thousands or millions, it becomes infeasible to evaluate the effective access permissions defined by security policies by hand or by visual inspection. Effective mechanisms are needed for an enterprise system to evaluate the effective access permissions defined by security policies associated with the principal.

Embodiments herein present mechanisms to evaluate the effective access permissions defined by security policies associated with a principal. A security policy can include multiple policy statements. Instead of performing the evaluation for individual security policies, embodiments herein classify the policy statements of the security policies into a set of allow policy statements, and a set of deny policy statements. Such a classification can improve the efficiency of the effective access permissions evaluation compared to the evaluation based on security policies. In addition, the effective access permissions is represented by a specially designed structure, which further improves the efficiency of the computation, the compactness of the representation, and the readability of the resulting effective access permissions by a human user or administrator. For each allow policy statement of the set of allow policy statements, a list of deny policy statements associated with the allow policy statement with respect to the effective access permissions is identified. The effective access permissions associated with the principal related to the allow policy statement are defined by a system resource included in the system resource set of the allow policy statement but not included in the system resource set of the list of deny policy statements. The total effective access permissions associated with the principal is the union of all the effective access permissions associated with the principal related to the allow policy statements in the set of allow policy statements.

FIG. 1 is a block diagram of an environment 100 for evaluating effective access permissions defined by a set of security policies associated with a principal in an IAM system. Environment 100 can include enterprise system 110, policy engine 120, and IAM system 131, which can reside in a cloud computing system 130. Policy engine 120 can generate the set of effective access permissions 125. Based on the set of effective access permissions 125, environment 100 can be used to determine a compliance status of a principal of the IAM system with respect to a set of security rules 124. In addition, enterprise system 110 can be communicatively coupled to a computing device 140 that can be used by a person 142.

In some examples, environment 100 can include a network formed by some or all of computing device 140, enterprise system 110, and cloud computing system 130. For example, environment 100 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some examples, cloud computing system 130 can include an environment that delivers computing as a service or shared resources. Cloud computing system 130 can provide computation, software, data access, storage, and/or other services that do not require end-user knowledge of a physical location and configuration of a system and/or a device that delivers the services. In some examples, cloud computing system 130 can include Amazon® Web Services (AWS), Microsoft® Azure, Google® Cloud, IBM® Cloud, Oracle® Cloud Infrastructure, or any other cloud computing system.

Cloud computing system 130 can include IAM system 131, which can manage system resources 133. IAM system 131 can receive a request 119 for access to system resources 133 from entities in enterprise system 110 such as principal 111. Principal 111 can be a user 116, a role 113, a machine 115, or an application 151. IAM system 131 can include a plurality of data storage systems for storing system resources 133 to be accessed by enterprise system 110. IAM system 131 can include a database management system or relational database tool. IAM system 131 can further include a message queue or stream processing platform such as Apache Kafka or Apache Spark or other data storage systems like Apache Hadoop, Hadoop Distributed File System (HDFS), or Amazon S3, to name just some examples. IAM system 131 can be a data lake, data silo, semi-structured data system (comma-separated values file, logs, xml, etc.), unstructured data system, binary data repository, or other suitable repository. IAM system 131 can store thousands, millions, billions, or trillions (or more) of objects, rows, transactions, records, files, logs, etc. while allowing for the creation, modification, retrieval, archival, and management of this data.

System resources 133 can include hardware, e.g., processor, memory, storage, or software, e.g., operating system, application software, database, used for various computing purposes. A system resource can be referred to as a resource. Examples of system resources 133 can include Amazon Elastic Compute Cloud (Amazon EC2), Amazon Simple Storage Service (Amazon S3), Amazon DynamoDB, Amazon Redshift, an Amazon® Web Services (AWS) service, an EC2 instance, a S3 bucket, or a DynamoDB table, S3 Glacier vaults, Amazon Simple Notification Service (SNS) topics, or Amazon Simple Queue Service (SQS) queues. System resources 133 can be products or services provided by any other vendors besides Amazon®.

In some examples, computing device 140 can be a wireless communication device, a smart phone, a laptop, a tablet, a personal assistant, a monitor, a wearable device, an Internet of Thing (IoT) device, a mobile station, a subscriber station, a remote terminal, a wireless terminal, or a user device. Computing device 140 can be configured to operate based on a wide variety of wireless communication techniques. These techniques can include, but are not limited to, techniques based on 3rd Generation Partnership Project (3GPP) standards. In some other examples, computing device 140 can be a desktop workstation, a server, and/or embedded system, a computing device communicatively coupled to enterprise system 110 by wired lines, to name a few non-limiting examples, or any combination thereof. Person 142 can use computing device 140 to interact with enterprise system 110, and request system resources 133 managed by IAM system 131 and residing in cloud computing system 130. Computing device 140 can include processor 141, memory device 143, and a GUI 145. The functions and operations performed by person 142 can be performed by an application, or some other machines as well. Hence, functions and operations performed by person 142 can be equally applicable to other applications and machines.

In some examples, enterprise system 110 can include a server device (e.g., a host server, a web server, an application server, etc.), a data center device, or a similar device. Enterprise system 110 can include processor 117, memory device 118, display device 152 communicatively coupled to each other. GUI 119 can be displayed on display device 152. Enterprise system 110 further includes other components, e.g., an operating system, a storage coupled to processor, not shown. Enterprise system 110 may be implemented as any system that requests access to resources 133 protected by IAM system 131 that utilizes security policies and access permissions for controlling access to requested resources.

In some embodiments, enterprise system 110 can include any number of principals, e.g., principal 111, a policy database 112, and a security governance guideline 114, which can be stored in memory device 118. Principal 111 can include role 113, which can be user 116 or machine 115, or application 151. In the following descriptions, role 113 can be used as an example of principal 111. Policy database 112 can include one or more security policies, which can be referred to as a policy, associated with roles or principals. For example, policy 113*a*, policy 113*b*, and policy 113*c* are associated with role 113. Combined, the security policies, e.g., policy 113*a*, policy 113*b*, or policy 113*c*, can generate an effective policy 123 for role 113, which can define a set of effective access permissions 125 by role 113 to access system resources 133.

In some embodiments, security governance guideline 114 can define a set of security rules 124 including various security rules, e.g., security rule 126. Security rule 126 can set up a permissible scope of a name for role 113 or a permissible scope of a name for system resources 133 being specified by any security policies. Compliance engine 122 can be configured to receive the effective policy 123 indicating the set of effective access permissions 125 from effective policy generator 121, and security rule 126, and determine whether there is over-privileged access permission 128. If the set of effective access permissions 125 contains over-privileged access permission 128, role 113 has a compliance status 153 as non-compliant. On the other hand, if compliance engine 122 cannot detect any over-privileged access permission for the set of effective access permissions 125, role 113 has compliance status 153 as compliant. Role 113 and its compliance status 153 can be displayed on GUI 119 of enterprise system 110.

Enterprise system 110 can be communicatively coupled to policy engine 120, where effective policy generator 121 and compliance engine 122 can be implemented to perform operations about security policies and access permissions. In some embodiments, policy database 112 can be implemented separately from enterprise system 110, such as in policy engine 120 and/or IAM system 131 coupled to enterprise system 110. In some other embodiments, policy engine 120 can be implemented as a part of enterprise system 110.

In some examples, role 113 can be used to delegate access to users, applications, or services that do not normally have access to system resources 133. For example, role 113 can be used to delegate access by a mobile app on computing device 140 to use system resources 133, which would not be normally accessible by a mobile application. Role 113 can be used to grant access to resources in one account to a trusted principal in a different account. Instead of being uniquely associated with one person, role 113 is intended to be assumable by anyone who needs it. Also, role 113 may not have standard long term credentials such as a password or access keys associated with it. Instead, role 113 can be provided with temporary security credentials for a session when the role is effective or valid.

Role 113 can include a machine 115 or a user 116. Machine 115 can be a representation of computing device 140, while user 116 can be a representation of person 142. User 116 can be an identity of person 142 in the service. Role 113 can be an identity that has specific access permissions. Role 113 can access system resources 133 based on access permissions defined by associated security policies, e.g., policy 113a, policy 113b, and policy 113c, which can be collectively referred as "policies 113."

Principal 111, e.g., role 113, can submit request 119 for accessing system resources such as system resources 133 which are protected by IAM system 131. Request 119 can include a request context information, which is used to evaluate and authorize the request. The request context information can include actions or operations to be performed, resources upon which the actions or operations are performed, a principal that can be a person or an application that an entity to send request 119, environment data such as IP address, user agent, SSL enabled status, or the time of day; and resource data such as data related to the resource that is being requested. Information about the principal can include the policies that are associated with the entity that the principal used to sign in. Resource data can include information such as a database table name or a tag on an Amazon EC2 instance, for example. Request 119 can be allowed or denied based on the security policies, e.g., policy 113a, policy 113b, and policy 113c, associated with role 113.

A security policy, e.g., policy 113a, policy 113b, or policy 113c, can be stored in a storage of cloud computing system 130. Combined, the security policies, e.g., policy 113a, policy 113b, or policy 113c, can generate effective policy 123, which can define a set of effective access permissions 125 by role 113 to access system resources 133. The generation of effective policy 123 and the set of effective access permissions 125 can be performed by effective policy generator 121 within policy engine 120. The set of effective access permissions 125 represent the actual access permissions granted to role 113 by the security policies associated with role 113. In some examples, a system administrator can create the set of security policies that generates the set of effective access permissions 125 for role 113.

In addition, security governance guideline 114 can define a set of security rules 124 including various security rules, e.g., security rule 126. Security rule 126 can specify what kind of access permissions should be granted to various roles or system resources in an enterprise or an organization. As such, security rule 126 can set up the scope for what access permission is allowed to be granted to various roles, e.g., role 113. For example, security rule 126 can set up a permissible scope of a name for role 113 or a permissible scope of a name for system resources 133 being specified by any security policies. As an example, security rule 126 can include various statements, e.g., "a role name must be a machine", "a wildcard is allowed after a specific bucket to enable access to all objects in a single bucket," and more.

Often, the set of security policies actually defining the set of effective access permissions 125 for role 113 and the set of security rules 124 defining the permissible scopes for access permissions for role 113 are defined or generated at different times, by different people within the enterprise. Hence, it is possible that the set of effective access permissions 125 actually granted to role 113 can be different from what is allowed to be granted to role 113 as defined by security rule 126 or the set of security rules 124. An access permission of the set of effective access permissions 125 is an over-privileged access permission when the access permission exceeds the permissible scope defined by security rule 126. Detection of over-privileged access permission 128 is performed by compliance engine 122 based on security rule 126 of the set of security rules 124 that is defined based on security governance guideline 114.

If role 113 has been granted an over-privileged access permission, request 119 may be able to access system resources 133 that should not be allowed to be accessed according to security rule 126. However, IAM system 131 or enterprise system 110 may not know such an over-privileged access permission has been granted until some bad consequence has happened after role 113 has accessed the system resource. Any corrective action to its roles is therefore reactive and presents a potential security concern because roles are not evaluated until a request is made and granted, and potentially some bad consequence may have already happened.

In some examples, policy engine 120 can be used to evaluate the set of effective access permissions 125 of role 113 without performing any request or without receiving any request context information. Policy engine 120 can be implemented as a separate component as shown in FIG. 1 or integrated as part of enterprise system 110. Policy engine 120 can include effective policy generator 121, the set of security rules 124, and compliance engine 122. Effective policy generator 121 can be configured to receive all policies associated with a role, such as policy 113a, policy 113b, and policy 113c associated with role 113, and generate effective policy 123 from the received policies. Effective policy 123 further defines the set of effective access permissions 125. Effective policy 123 and the set of effective access permissions 125 can be saved in a storage located outside IAM system 131 and separated from IAM system 131. Therefore, policy engine 120 is implemented by a particular machine, instead of a generic computing system. For example, IAM system 131, which is a generic computing system, is separated from policy engine 120 so that policy engine 120 can evaluate the policies without accessing IAM system 131. Based on such an implementation on a special machine, policy engine 120 can provide added security protection for IAM system 131.

Figure 2A:
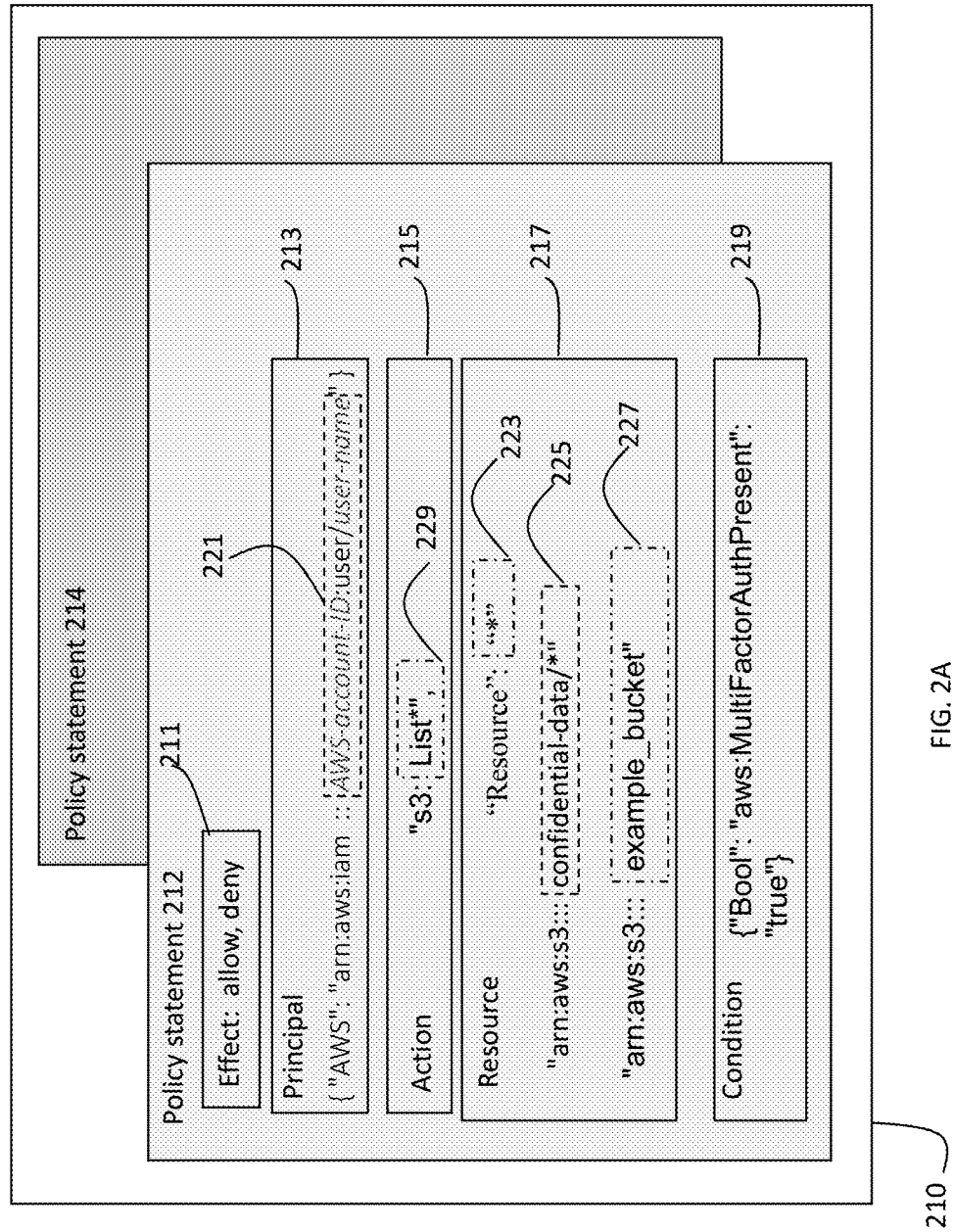
FIGS. 2A-2B illustrate example security policy statements of a security policy and rules for resolving conflicts between security policy statements, according to some embodiments.
Figure 2B:
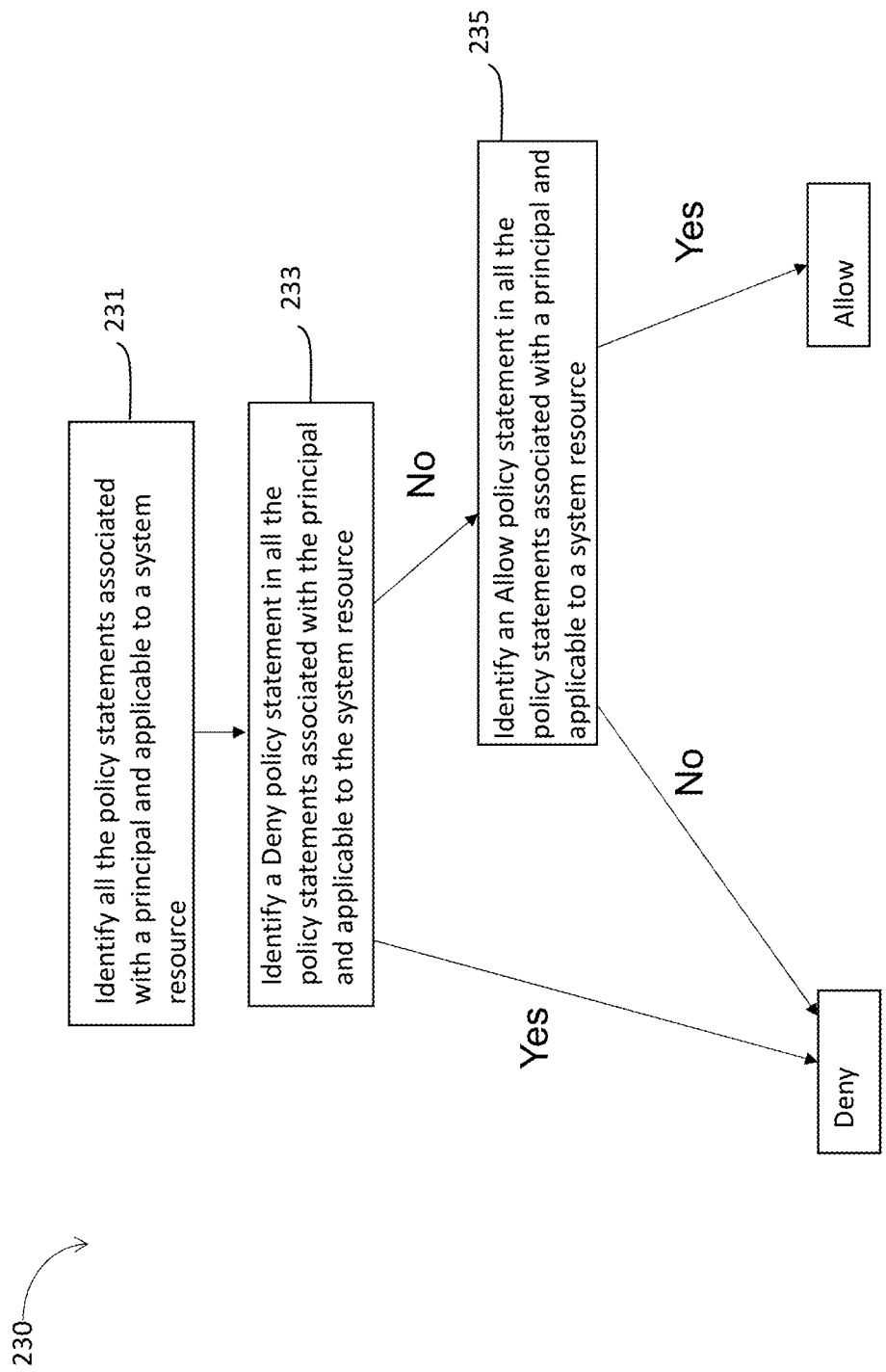

FIGS. 2A-2B illustrate example security policy statements of a security policy, e.g., security policy 210, and rules for resolving conflicts between security policy statements. Security policy 210 can be an example of policy 113a, policy 113b, policy 113c as shown in FIG. 1. Security policy 210 can include a policy statement 212 and a policy statement 214.

In some examples, security policy 210 can be an identity-based policy, a resource-based policy, a permissions boundary, an organizational service control policy (SCP), an access control list, a session policy, an inline policy, or any kind of security policy. An identity-based policy can be attached to an identity such as a user, a group of users, or a role, and grant permissions to the identity. A resource-based policy can grant permissions to a principal (account, user, role, or federated user) specified in the policy to access the resource. The permissions define what the principal can do with the resource to which the policy is attached. A permissions boundary, an organizational service control policy (SCP), an access control list, or a session policy can also be referred to as a limiting security policy that allows the principal to the system resource set of the limiting security policy.

In some examples, security policy 210 can be stored in a storage of cloud computing system 130. In some examples, security policy 210 can be specified by nature language. In some other examples, security policy 210 can be specified by one or more statements in a markup language or structured language. Security policy 210 can be contained in a document specified by a markup language, such as a JavaScript Object Notation (JSON) document, a XML document, a YAML document, or any other documents containing statements in structured languages. Natural language processing can be used to convert a security policy in natural language, e.g., English, to a structured language.

In some examples, security policy 210 can include multiple statements, e.g., policy statement 212, policy statement 214, or more. A policy statement can further include various component statements. In some examples, policy statement 212 can include an effect statement 211, a principal statement 213, an action statement 215, a resource statement 217, a condition statement 219, or some other component statements. Policy statement 214 can include similar component statements. In addition, there can be other statements, such as a version statement, a statement name (also referred to as an identification (ID)), and more, not shown.

Effect statement 211 can specify either Allow or Deny to indicate whether the policy statement 212 allows or denies access. Principal statement 213 can be used to indicate an account, an application, a user, a role, or a group of users to which the access permission is allowed or denied. Action statement 215 can include a list of actions to be performed on the one or more system resources that the policy allows or denies. Action statement 215 can include a read-only action, a view action, an update action, a write action, a delete action, an NotAction, or some other actions. Resource statement 217 can specify a list of resources to which the actions apply. Condition statement 219 can specify the circumstances under which the policy grants permission.

A policy statement can specify whether members of an identity set are allowed or denied access to a system resource set of the IAM system. A policy statement, e.g., policy statement 212, can be referred to as an allow policy statement when the effect statement specifies Allow to indicate that members of an identity set are allowed access to a system resource set of the IAM system. In addition, a policy statement can be referred to as a deny policy statement when the effect statement specifies Deny to indicate that members of an identity set are denied access to a system resource set of the IAM system.

The identify set can include more than more principal, and the system resource set can include more than one system resource. The identify set and the system resource set of a policy statement are both represented by various names. In some examples, a policy statement can include a name for a principal, e.g., name 221 within principal statement 213; a name for a system resource, e.g., name 223, name 225, name 227, within resource statement 217; or a name for an action, e.g., name 229 within action statement 215, or some other names.

A name for a system resource can refer to one or more system resources. For example, name 223 includes only "*", which is a wildcard referring to any system resources in the account. On the other hand, name 227 includes "example_bucket", which refers to only one bucket stored in S3. In addition, name 225 includes "confidential-data/*", which refers to a set of system resources within the folder "confidential-data." Therefore, a name for a system resource can refer to system resource set of the IAM system of various sizes, as shown above For example, name 227 specifies only one system resource, "example_bucket", while name 223 specifies every system resource of the account, "*". The set of system resources referred by a name for a system resource defines a scope of the name for the system resource. When a scope of the name for a system resource in a security policy statement includes more than one system resource, the security policy statement can be applicable to any system resource whose name is included in the scope of the name for the system resource.

Similarly, a scope of a name for a principal can define members of an identity set. For example, name 221 "AWS-account-ID:user/user-name" can refer to only one user. On the other hand, a name "AWS-account-ID:user/*" can refer to a group of users or principals. AWS is used here as an example. Other IAM systems can have similar examples. When a scope of a name for a principal in a security policy statement includes more than one principal, the security policy statement can be applicable to any principal whose name is included in the scope of the name for the role. A principal is a member of an identity set defined by a name of the principal. Accordingly, a policy statement can indicate members of an identity set are allowed to access a system resource set of the IAM system.

Accordingly, for a system resource, the name of the system resource can be included in multiple policy statements of multiple security policies, either explicitly or implicitly as shown above. In some examples, a first security policy can include a first policy statement applicable to the system resource, and a second security policy can include a second policy statement applicable to the same system resource. Moreover the first policy statement may grant access to the system resource while the second policy statement may deny access to the system resource by the same principal. Accordingly, a conflict between the first security policy and the second security policy occurs when the first policy statement and the second policy statement have conflicting effects on the system resource or the role. Depending on the kind of policy statements and the kind of security policies, different conflict can be resolved in different ways.

FIG. 2B illustrates example rules 230 for resolving conflicts between policy statements. The rules 230 can be applied by effective policy generator 121 when evaluating effective access permissions for a set of security policies associated with a principal, e.g., security policy 210.

According to rule 231, to determine whether a principal can access a system resource, effective policy generator 121 can first determine all the security policy statements applicable to the principal and the system resource. Effective policy generator 121 can identify a deny policy statement associated with the principal and applicable to the system resource that specifies "Deny" in its effect statement. In addition, effective policy generator 121 can identify an allow policy statement associated with the principal and applicable to the system resource that explicitly specifies "Allow" in its effect statement. Effective policy generator 121 can systematically go through all the policy statements of all the security policies associated with the principal and applicable to the system resource.

As indicated by rule 233, if a deny policy statement is identified, the effective access permission by the principal for the system resource is Deny. In other words, a deny statement can overwrite any other policy statement, and the principal is denied access to the system resource.

As indicated by rule 235, if no deny policy statement is identified, but an allow policy statement is identified, the effective access permission by the principal for the system resource is allow, and the principal is allowed to access the system resource. Otherwise, if no deny policy statement and no allow policy statement is identified to be associated with the principal and applicable to the system resource, the principal is implicitly denied access to the system resource.

Rules 230 are some examples of rules for resolving conflicts between different security policy statements associated with a principal. In some other examples, an allow policy statement to grant access to the system resource by the principal can overwrite a deny policy statement. In some other examples, when there is no deny policy statement and no allow policy statement associated with the principal and applicable to the system resource, the principal can be implicitly allowed to access the system resource. Different IAM system 131 can implement different rules. Examples shown in FIG. 2B are just some specific rules and implementations, not a generic or abstract idea to resolve the conflicts between different security policies.

Figure 3:
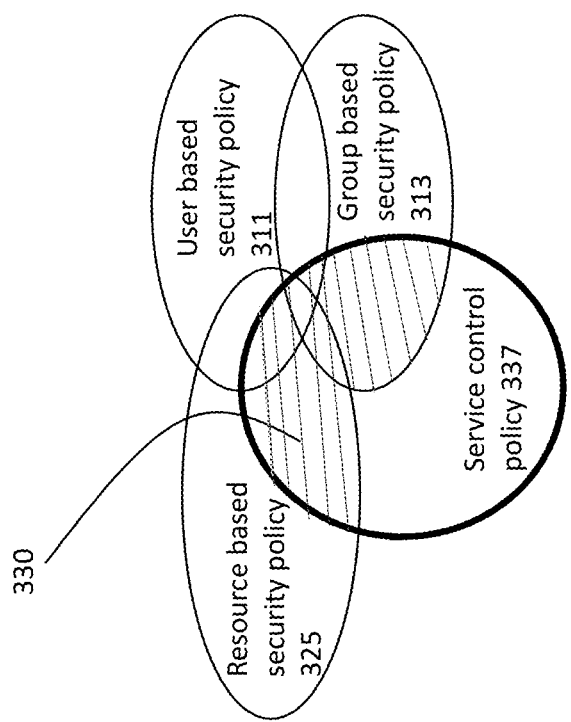
FIG. 3 illustrates example effective access permissions defined by a set of security policies associated with a principal, according to some embodiments.

FIG. 3 illustrates an example set of effective access permissions 330 defined by multiple security policies, which can be an example of the set of effective access permissions 125 shown in FIG. 1. As shown in FIG. 3, multiple security policies, e.g., policy 311, policy 313, policy 325, and policy 337, can be associated with a principal to generate a set of effective access permissions 330, which can be an example of the set of effective access permissions 125. Different security policies can generate the set of effective access permissions in different ways. Each of the security policies, e.g., policy 311, policy 313, policy 325, and policy 337, can be an example of security policy 210 and can contain multiple policy statements.

In some examples, both policy 311 and policy 313 are identity-based policy. Policy 313 is applicable to a single role, e.g., role 113, while policy 313 is applicable to a group of roles including role 113. Hence, the scope of policy 311 is a set of roles including only one role, while the scope of policy 313 is a set of roles including a group of roles. In the description below, the scope of policy 311 can be simply denoted by the policy number "311", and the scope of policy 313 can be simply denoted by the policy number "313". For an action to be performed, an effective access permission can be in a union of the set of access permissions defined by policy 311 or policy 313. Hence, the set of effective access permissions 125 defined by policy 311 and policy 313 is 311 ∪ 313. Accordingly, given policy 311 and policy 313, for request 119, IAM system 131 can check both policy 311 and policy 313 for at least one allow policy statement for granting an access to the system resource for role 113.

In addition, policy 325 is a resource-based policy. For an action to be performed, an effective access permission can be in a union of the set of access permission defined by policy 311, policy 313, and policy 325, e.g., 311 ∪ 313 ∪ 325. Hence, for request 119, IAM system 131 can check policy 231, policy 233, and policy 235 for an allow policy statement for granting an access to the system resource.

Further, policy 337 can be a SCP. In this case, policy 337 limits the total permissions granted by the resource-based policy and the identity-based policy. The resulting effective access permissions are the intersection of the session policies and either the resource-based policy or the identity-based policy, denoted as (311 ∪ 313 ∪ 325) ∩ 337.

The examples of effective access permissions shown in FIG. 3 are only for example purpose and are not limiting. There can be other kinds of security policies. An organization's SCP can specify the maximum permissions for an organization or organizational unit (OU), which is applicable to individual roles, e.g., role 113. The SCP maximum applies to principals in member accounts, including each account root user of the organization. If an SCP is present, identity-based and resource-based policies grant permissions to principals in member accounts only if those policies and the SCP allow the action. If both a permissions boundary and an SCP are present, then the boundary, the SCP, and the identity-based policy must all allow the action. In addition, access control lists (ACLs) are service policies that control which principals in another account can access a resource.

Accordingly, FIG. 3 illustrates an example for the set of effective access permissions 330, which can be examples of the set of effective access permissions 125 defined by a set of security policies. The set of effective access permissions 125 can be generated by effective policy generator 121 within policy engine 120. Effective policy generator 121 can receive all of the security policies applicable or associated with role 113, which is called the effective policy 123. Based on the effective policy 123, the set of effective access permissions 125 can be generated similar to examples shown in FIG. 3.

Figure 4A:
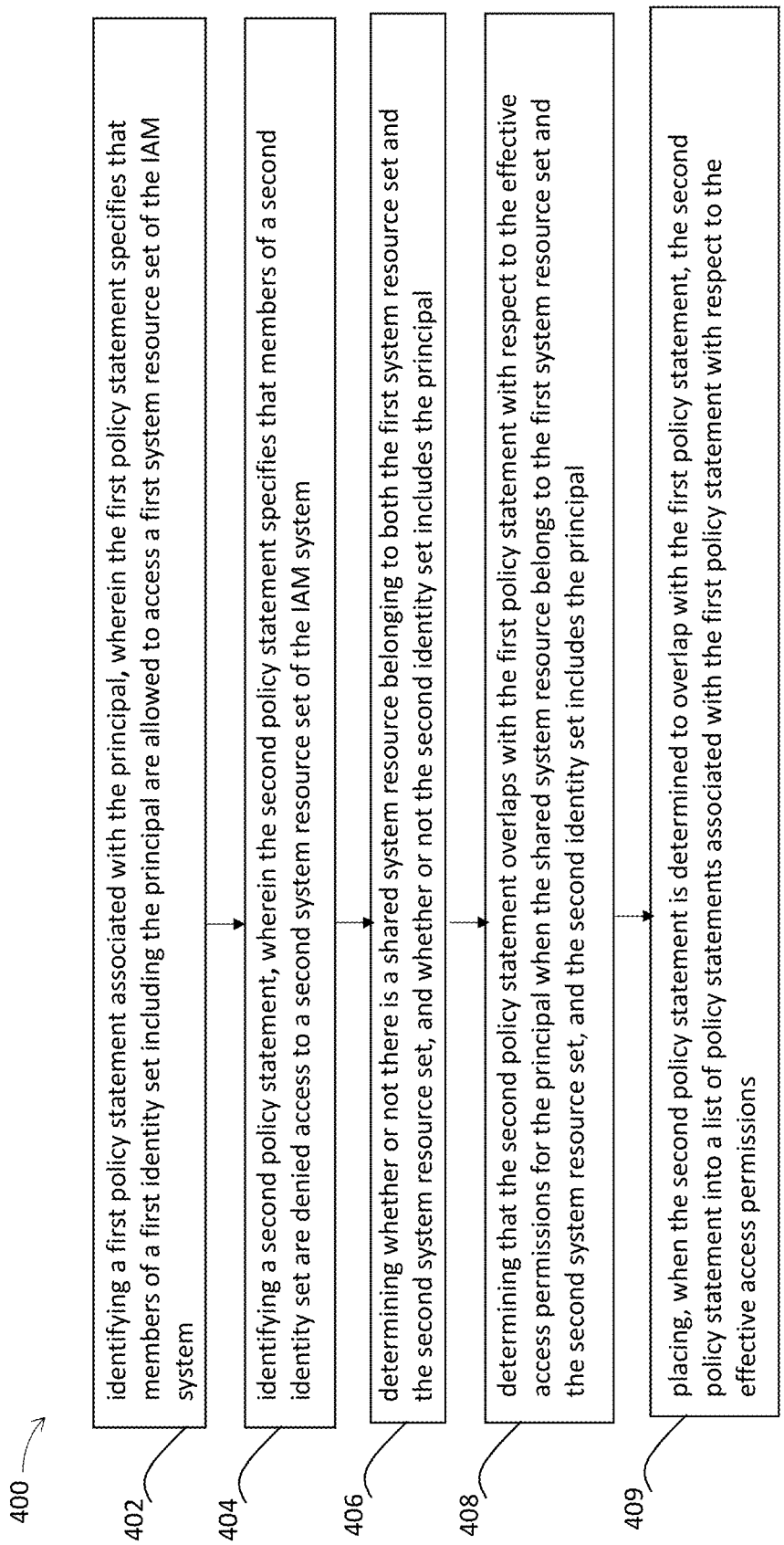
FIGS. 4A-4C illustrate example methods for evaluating effective access permissions defined by a set of security policies associated with a principal, according to some embodiments.
Figure 4B:
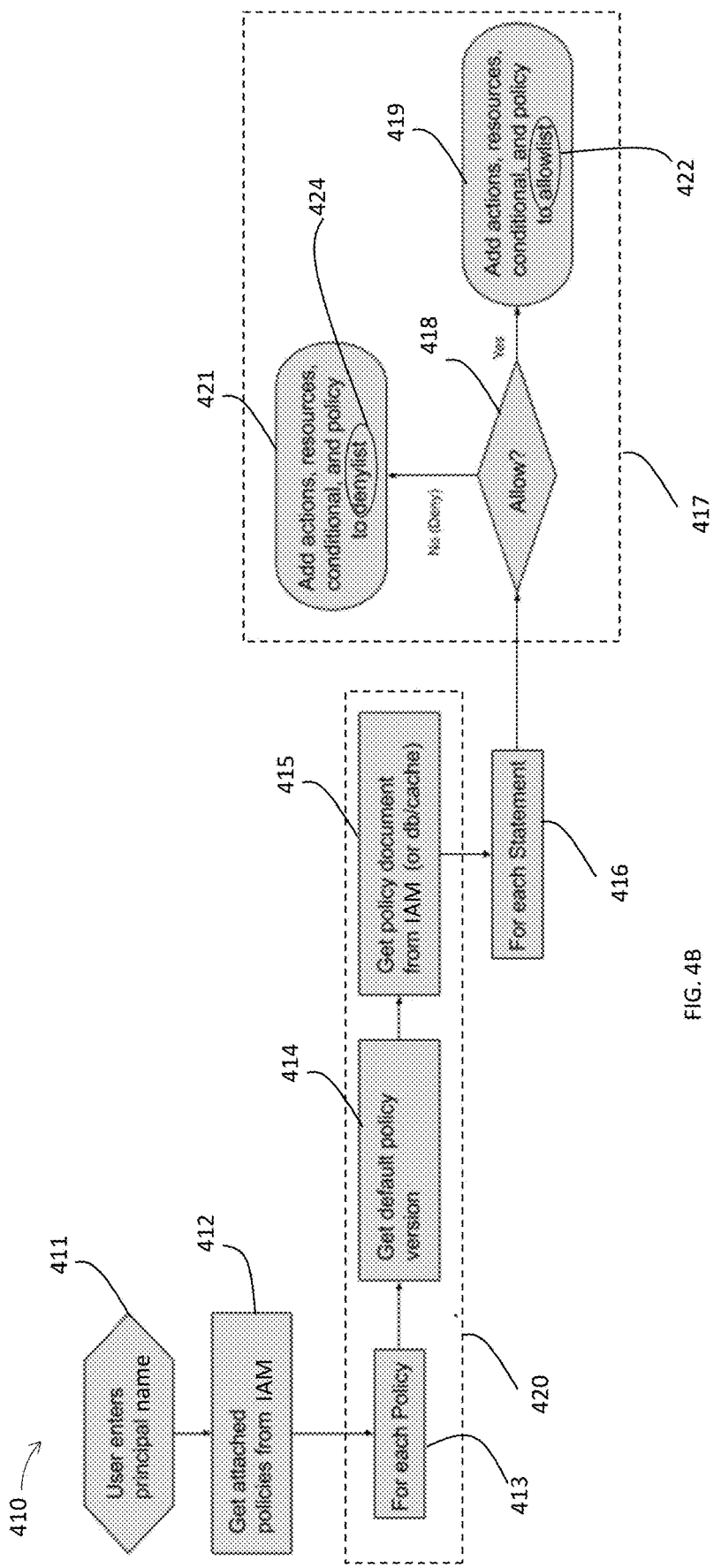
Figure 4C:
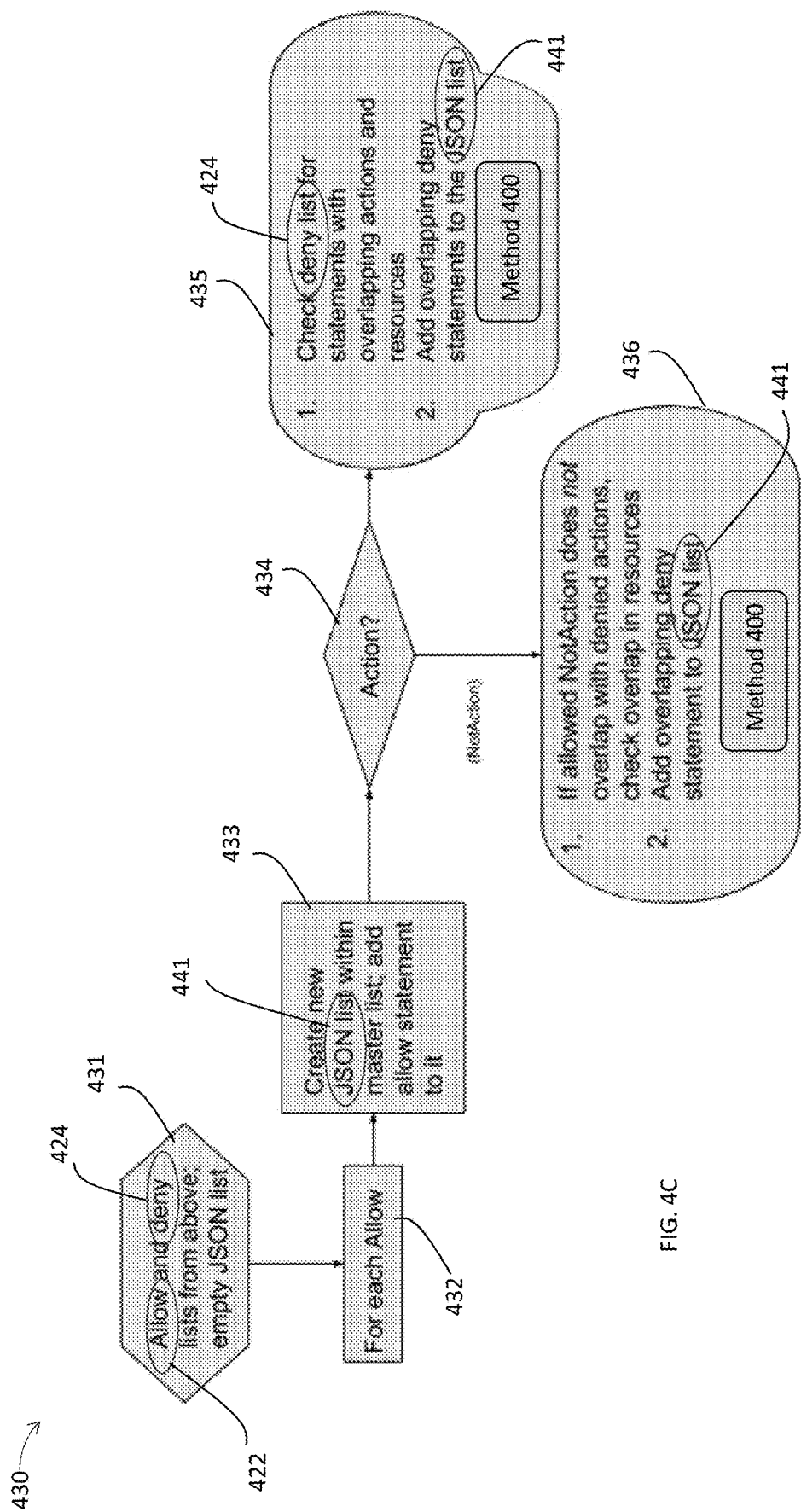

FIGS. 4A-4C illustrate example methods, e.g., method 400, method 410, method 430, for determining effective access permissions defined by a set of security policies associated with a principal, according to some embodiments. Method 400, method 410, method 430 can be performed by effective policy generator 121 within policy engine 120. Method 400 operates on an allow policy statement and a deny policy statement, while method 410 and method 430 operate on security policies that may include multiple policy statements.

In 402, effective policy generator 121 can identify a first policy statement associated with the principal, where the first policy statement specifies that members of a first identity set including the principal are allowed to access a first system resource set of the IAM system. For example, as shown in FIGS. 1 and 2A, effective policy generator 121 can identify policy statement 212 specifying that members of a first identity set including role 113 are allowed to access a first system resource set of the IAM system.

In 404, effective policy generator 121 can identify a second policy statement, where the second policy statement specifies that members of a second identity set are denied access to a second system resource set of the IAM system. For example, as shown in FIGS. 1 and 2A, effective policy generator 121 can identify policy statement 214 specifying that members of a second identity set are denied access to a second system resource set of the IAM system.

In 406, effective policy generator 121 can determine whether or not there is a shared system resource belonging to both the first system resource set and the second system resource set, and whether or not the second identity set includes the principal. For example, as shown in FIGS. 1 and 2A, effective policy generator 121 can determine whether or not there is a shared system resource belonging to both the first system resource set of policy statement 212 and the second system resource set of policy statement 214, and whether or not the second identity set includes role 113.

In 408, effective policy generator 121 can determine that the second policy statement overlaps with the first policy statement with respect to the effective access permissions for the principal when the shared system resource belongs to the first system resource set and the second system resource set, and the second identity set includes the principal. For example, effective policy generator 121 can determine that policy statement 214 overlaps with policy statement 212 with respect to the effective access permissions for the principal when the shared system resource belongs to the first system resource set and the second system resource set, and the second identity set includes the principal. The effective access permissions associated with role 113 are defined by a system resource included in the first system resource set but not included in the second system resource set.

In 409, when the second policy statement is determined to overlap with the first policy statement, effective policy generator 121 can place the second policy statement into a list of policy statements associated with the first policy statement with respect to the effective access permissions. For example, when policy statement 214 is determined to overlap with policy statement 212, effective policy generator 121 can place policy statement 214 into a list of policy statements associated with policy statement 212 with respect to the effective access permissions.

FIGS. 4B-4C illustrate method 410 and method 430 operating on security policies that may include multiple policy statements. Method 410 and method 430 can call method 400 to operate on individual policy statements when needed. Method 410 and method 430 can be performed by effective policy generator 121 within policy engine 120.

According to method 410, at 411, a user can enter a principal name. At 412, effective policy generator 121 can gather all the security policies from the IAM attached to the principal. In some examples, all the security policies attached to the principal can be a large number of security policies, e.g., millions of security policies. For each security policy 413, which can be similar to security policy 210, method 410 can perform iteration 420. The iteration 420 can be operated multiple times, one for each policy. Iteration 420 can include operations performed at 414, 415, 416, 418, 419, and 421.

For policy 413, at 414, effective policy generator 121 can retrieve the policy version, which can help to ensure the policy is a current version. At 415, effective policy generator 121 can further retrieve the policy document stored in the IAM, a database, or cache. The policy document for policy 413 can be stored in a cloud and specified by a markup language. The policy document for policy 413 can contain multiple policy statements. Effective policy generator 121 can inspect the policy document for policy 413.

For each policy statement 416 of policy 413, at 418, effective policy generator 121 can check the effect statement to determine whether the specified effect is "allow" or not.

If the effect statement of policy statement 416 is Allow, at 419, effective policy generator 121 can add the actions, resources, conditions of policy statement 416 into an allow list 422. On the other hand, when the effect statement of policy statement 416 is Deny, at 421, effective policy generator 121 can add the actions, resources, conditions of policy statement 416 into a deny list 424.

As a result of method 410, effective policy generator 121 can gather all the security policies associated with the principal, and sort out all the policy statements inside each policy into two lists of policy statements, one for allow policy statements, and one for deny policy statements. The two classified lists can improve the efficiency for the evaluation of effective access permissions. Without the classification of all the policy statements of different security policies into two separated allow list and deny list, effective policy generator 121 can quickly become overwhelmed by the computations to evaluate the effective access permissions defined by millions of security policies. Allow list 422 may refer to the set of allow policy statements, which can be implemented by a list, a tree, a table, or any other data structure. Similarly, deny list 424 may refer to the set of deny policy statements, which can be implemented by a list, a tree, a table, or any other data structure.

Method 430 shown in FIG. 4C is a continuation of method 410 shown in FIG. 4B, and can be performed by effective policy generator 121.

At 431, allow list 422 and deny list 424 are provided from method 410 described above.

At 433, for each allow policy statement 432 of allow list 422, effective policy generator 121 creates a new and separated list 441, and adds allow policy statement 432 into list 441. List 441 may be specified in JSON format. List 441 can be referred to as a list of policy statements associated with allow policy statement 432 with respect to the effective access permissions. The effective access permission for a principal is generated based on each allow policy statement 432. A list of policy statements associated with allow policy statement 432 with respect to the effective access permissions includes allow policy statement 432 together with other deny policy statements that overlaps with allow policy statement 432 with respect to the effective access permissions.

At 434, allow policy statement 432 is tested to see whether allow policy statement 432 contains "NotAction" in its action statement or not. If allow policy statement 432 contains Actions, without "NotAction," at 435, effective policy generator 121 can check deny list 424 for deny policy statements with overlapping actions and resources, and further add overlapping deny policy statements to list 441 for allow policy statement 432. Detailed operations at 435 can be similar to method 400.

On the other hand, if allow policy statement 432 contains "NotAction," at 436, effective policy generator 121 can check deny list 424 for deny policy statements for two conditions, (1) the allowed NotAction does not overlap with denied actions, (2) the resources of the deny policy statement overlaps with the resources of allow policy statement 432. If both conditions are satisfied, effective policy generator 121 can add the deny policy statements into list 441 for allow policy statement 432. Detailed operations at 435 can be similar to method 400.

Operations performed at 435 or at 436 include iterations to go through deny list 424 for each deny policy statement of deny list 424. For a selected deny policy statement specifying that members of an identity set are denied access to a system resource set of the IAM system, effective policy generator 121 can determine whether or not there is a shared system resource belonging to both the system resource set of allow policy statement 432 and the system resource set of the selected deny policy statement, and whether or not the identity set of the selected deny policy statement includes the principal. If the identity set of the selected deny statement does not include the principal, or there is no shared system resource belonging to both the system resource set of allow policy statement 432 and the system resource set of the selected deny policy statement, the selected deny policy statement does not overlap with allow policy statement 432. Hence, the selected deny policy statement is not added to list 441 of deny policy statements associated with the allow policy statement 432 with respect to the effective access permissions.

In addition, method 430 can include iterations of operations performed at 433, 434, 435, or 436 for different allow policy statements. For example, effective policy generator 121 can identify a second allow policy statement of allow list 422. The second allow policy statement of allow list 422 can specify that members of a second identity set including the principal are allowed to access a second system resource set of the IAM system. At 433, a list of policy statements associated with the second allow policy statement with respect to the effective access permissions can be generated. At 435, effective policy generator 121 can identify a deny policy statement, wherein the deny policy statement specifies that members of an identity set are denied access to a system resource set of the IAM system. Effective policy generator 121 can determine whether or not there is a shared system resource belonging to both the second system resource set and the system resource set of the deny policy statement, and whether or not the identity set of the deny policy statement includes the principal. When there is a shared system resource belonging to the second system resource set and the system resource set of the deny policy statement, and the identity set of the deny policy statement includes the principal, the second allow policy statement overlaps with the deny policy statement. The effective access permissions associated with the principal are defined by a system resource included in the second system resource set but not included in the system resource set of the deny policy statement. The deny policy statement can be added to the list of policy statements associated with the second allow policy statement with respect to the effective access permissions.

In some examples, there can be different policy statements. For example, effective policy generator 121 can pull all identity-based policy, resource-based policy, and SCP policy documents attached to a principle. Effective policy generator 121 can further identify any policy statements of the SCP policy that contain an Allow policy statement. If there is an allow policy statement of the SCP policy, according to the rules established in FIG. 3, effective policy generator 121 can loop through the identity-based and resource-based policy statements, and add the statement to a list if it is an allow statement and either there is no SCP Allow statement or it overlaps with the existing SCP Allow statement. When an allow policy statement from an identity-based and resource-based policy does not overlap with the SCP Allow statement, the allow policy statement is discarded. In addition, effective policy generator 121 can add all Deny policy statements in all types of policies to a different list. As a result, two lists of policy statements are generated, one for allow policy statements and one for deny policy statements, similar to the two lists 422 and 424 generated at 419 and 421 as shown in FIG. 4B. Afterwards, effective policy generator 121 can perform method 430 as shown in FIG. 4C to generate a group of lists, where each list is a list of policy statements associated with an allow policy statement with respect to the effective access permissions. Each list of policy statements associated with the allow policy statement with respect to the effective access permissions can contain one allow statement followed by any number of overlapping deny statements.

In some embodiments, a policy statement including NotAction or NotResource is not evaluated to its resultant Action or Resource since there can be possible hundreds of actions with each service type and to list every action or resource would overwhelm a human user. The list of lists generated by method 430 in FIG. 4C can be a useful form of representation for effective access permissions. Such group of lists, where each list is a list of policy statements associated with an allow policy statement with respect to the effective access permissions, can be operated by effective policy generator 121, while it is also readable by a human user. Such a group of lists are not simply an abstract idea of a list of lists. Instead, it is specifically tied to lists including an allow policy statement followed by a set of deny policy statements to define the effective access permissions.

Figure 5:
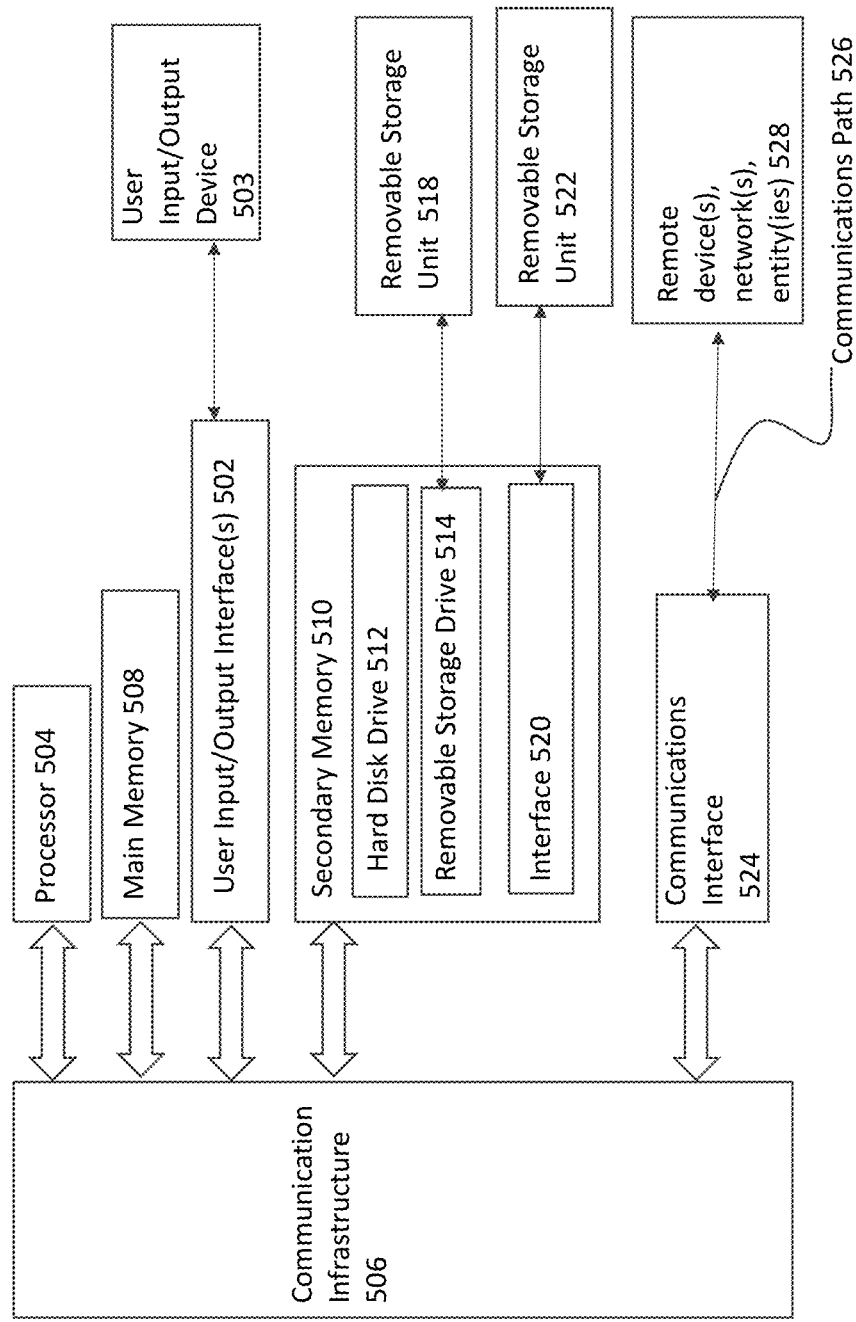
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. In some examples, computer system 500 can be used to implement computing device 140, enterprise system 110, effective policy generator 121, policy engine 120 as shown in FIG. 1, or operations shown in FIGS. 4A-4C.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/ any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein. For example, control logic may cause processor 504 to select a first role administered by an entity and a second role administered by the entity; identify a first set of security policies associated with the first role, and a second set of security policies associated with the second role, wherein the first set of security policies includes a first security policy and a second security policy; generate a first set of effective access permissions associated with the first role, and a second set of effective access permissions associated with the second role, wherein the first set of effective access permissions is generated based on the first set of security policies by resolving at least a conflict between the first security policy and the second security policy, and wherein the first set of effective access permissions defines a scope of a name for a system resource, or defines a scope of a name for a role; compare a permissible scope of the name for the system resource defined by a set of security rules with the scope of the name for the system resource to generate a first comparison result, and compare a permissible scope of the name for the role defined by the set of security rules with the scope of the name of the role to generate a second comparison result; and display on a graphical user interface (GUI), the first role and a first compliance status with respect to the set of security rules, and the second role and a second compliance status with respect to the set of security rules, wherein the first compliance status of the first role with respect to the set of security rules is determined based on the first comparison result and the second comparison result.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for determining effective access permissions defined by security policies associated with a principal managed by an identity and access management (IAM) system, the method comprising:

identifying, by a policy engine, a first policy statement associated with the principal, wherein the first policy statement specifies that members of a first identity set including the principal are allowed to access a first system resource set of the IAM system;

identifying, by the policy engine, a second policy statement, wherein the second policy statement specifies that members of a second identity set are denied access to a second system resource set of the IAM system;

determining, by the policy engine, whether or not there is a shared system resource belonging to both the first system resource set and the second system resource set, and whether or not the second identity set includes the principal;

determining, by the policy engine, that the second policy statement overlaps with the first policy statement for the principal when the shared system resource belongs to the first system resource set and the second system resource set, and the second identity set includes the principal, wherein the effective access permissions associated with the principal are defined by a system resource included in the first system resource set but not included in the second system resource set;

placing, by the policy engine, when the second policy statement is determined to overlap with the first policy statement, the second policy statement into a list of policy statements associated with the first policy statement;

generating, by the policy engine, a set of effective access permissions for the principal based on the first policy statement and the list of policy statements associated with the first policy statement; and determining an over-privileged access permission for the principal based on the set of effective access permissions without the IAM system receiving a request for accessing the first system resource set or the second system resource set of the IAM system.

2. The computer-implemented method of claim 1, further comprising:

identifying a third policy statement, wherein the third policy statement specifies that members of a third identity set are denied access to a third system resource set of the IAM system;

determining whether or not there is a shared system resource belonging to both the first system resource set and the third system resource set, and whether or not the third identity set includes the principal;

determining that the third policy statement does not overlap with the first policy statement for the principal when there is no shared system resource that belongs to the first system resource set and the third system resource set, or the third identity set does not include the principal, wherein the third policy statement is not placed on the list of policy statements associated with the first policy statement.

3. The computer-implemented method of claim 1,
identifying a third policy statement associated with the principal, wherein the third policy statement specifies that members of a third identity set including the principal are allowed to access a third system resource set of the IAM system;
identifying a fourth policy statement, wherein the fourth policy statement specifies that members of a fourth identity set are denied access to a fourth system resource set of the IAM system;
determining whether or not there is a shared system resource belonging to both the third system resource set and the fourth system resource set, and whether or not the fourth identity set includes the principal;
determining that the fourth policy statement overlaps with the third policy statement for the principal when the shared system resource belongs to the third system resource set and the fourth system resource set, and the fourth identity set includes the principal, wherein the effective access permissions associated with the principal are defined by a system resource included in the third system resource set but not included in the fourth system resource set; and
placing, when the fourth policy statement is determined to overlap with the third policy statement, the fourth policy statement into a list of policy statements associated with the third policy statement.

4. The computer-implemented method of claim 1, wherein the first policy statement or the second policy statement is a resource based policy statement or an identity based policy statement.

5. The computer-implemented method of claim 1, wherein the first system resource set or the first identity set of the first policy statement overlaps with a system resource set or an identity set of a limiting security policy that allows the principal to the system resource set of the limiting security policy, or there is no limiting security policy associated with the principal to limit the effective access permissions of the principal.

6. The computer-implemented method of claim 5, wherein the limiting security policy includes a permissions boundary, an organizational service control policy (SCP), or an access control list.

7. The computer-implemented method of claim 1, wherein the first policy statement, the second policy statement, and the list of policy statements associated with the first policy statement are stored in a cloud storage.

8. The computer-implemented method of claim 1, wherein the principal includes an IAM user, an IAM role, or an application.

9. The computer-implemented method of claim 1, wherein the first policy statement and the second policy statement are specified by a markup language.

10. The computer-implemented method of claim 1, wherein the first policy statement includes a first action to be allowed on the first system resource set or by the first identity set, and the second policy statement includes a second action to be denied on the second system resource set or by the second identity set.

11. The computer-implemented method of claim 10, wherein the first action or the second action includes a read-only action, a view action, an update action, a write action, a delete action, or a NotAction.

12. The computer-implemented method of claim 1, wherein an action contained in the second policy statement includes a NotAction.

13. An apparatus for managing an identity and access management (IAM) system, the apparatus comprising:
a storage device configured to store a set of security policies associated with a principal managed by an identity and access management (IAM) system, wherein the storage device is a separated device outside the IAM system, wherein the set of security policies includes a first policy statement and a second policy statement; and
a processor communicatively coupled to the storage device, and configured to:
identify a first identity set including the principal specified by the first policy statement, wherein members of the first identity set are allowed to access a first system resource set of the IAM system;
identify a second identity set specified by the second policy statement, wherein the second policy statement specifies that members of the second identity set are denied access to a second system resource set of the IAM system;
determine whether or not there is a shared system resource belonging to both the first system resource set and the second system resource set, and whether or not the second identity set includes the principal;
determine that the second policy statement overlaps with the first policy statement for the principal when the shared system resource belongs to the first system resource set and the second system resource set, and the second identity set includes the principal, wherein the effective access permissions associated with the principal are defined by a system resource included in the first system resource set but not included in the second system resource set;
place, when the second policy statement is determined to overlap with the first policy statement, the second policy statement into a list of policy statements associated with the first policy statement;
generate a set of effective access permissions for the principal based on the first policy statement and the list of policy statements associated with the first policy statement; and
determine an over-privileged access permission for the principal based on the set of effective access permissions without the IAM system receiving a request for accessing the first system resource set or the second system resource set of the IAM system.

14. The apparatus of claim 13, wherein the processor is further configured to:
identify a third policy statement, wherein the third policy statement specifies that members of a third identity set are denied access to a third system resource set of the IAM system;
determine whether or not there is a shared system resource belonging to both the first system resource set and the third system resource set, and whether or not the third identity set includes the principal;
determine that the third policy statement does not overlap with the first policy statement for the principal when there is no shared system resource that belongs to the first system resource set and the third system resource set, or the third identity set does not include the principal, wherein the third policy statement is not placed on the list of policy statements associated with the first policy statement.

15. The apparatus of claim 13, wherein the processor is further configured to:

identify a third policy statement associated with the principal, wherein the third policy statement specifies that members of a third identity set including the principal are allowed to access a third system resource set of the IAM system;

identify a fourth policy statement, wherein the fourth policy statement specifies that members of a fourth identity set are denied access to a fourth system resource set of the IAM system;

determine whether or not there is a shared system resource belonging to both the third system resource set and the fourth system resource set, and whether or not the fourth identity set includes the principal;

determine that the fourth policy statement overlaps with the third policy statement for the principal when the shared system resource belongs to the third system resource set and the fourth system resource set, and the fourth identity set includes the principal, wherein the effective access permissions associated with the principal are defined by a system resource included in the third system resource set but not included in the fourth system resource set; and place, when the fourth policy statement is determined to overlap with the third policy statement, the fourth policy statement into a list of policy statements associated with the third policy statement.

16. The apparatus of claim 13, wherein the first policy statement or the second policy statement is a resource based policy statement or an identity based policy statement.

17. The apparatus of claim 13, wherein the first system resource set or the first identity set of the first policy statement overlaps with a system resource set or an identity set of a limiting security policy that allows the principal to the system resource set of the limiting security policy, or there is no limiting security policy associated with the principal to limit the effective access permissions of the principal.

18. The apparatus of claim 17, wherein the limiting security policy includes a permissions boundary, an organizational service control policy (SCP), or an access control list.

19. A non-transitory computer-readable medium storing instructions, the instructions, when executed by a processor, cause the processor to perform operations by a policy engine for determining effective access permissions defined by security policies associated with a principal managed by an identity and access management (IAM) system, the operations comprising:
identifying a first policy statement associated with the principal, wherein the first policy statement specifies that members of a first identity set including the principal are allowed to access a first system resource set of the IAM system;

identifying a second policy statement, wherein the second policy statement specifies that members of a second identity set are denied access to a second system resource set of the IAM system;

determining whether or not there is a shared system resource belonging to both the first system resource set and the second system resource set, and whether or not the second identity set includes the principal;

determining that the second policy statement overlaps with the first policy statement for the principal when the shared system resource belongs to the first system resource set and the second system resource set, and the second identity set includes the principal, wherein the effective access permissions associated with the principal are defined by a system resource included in the first system resource set but not included in the second system resource set;

placing, when the second policy statement is determined to overlap with the first policy statement, the second policy statement into a list of policy statements associated with the first policy statement;

generating a set of effective access permissions for the principal based on the first policy statement and the list of policy statements associated with the first policy statement; and determining an over-privileged access permission for the principal based on the set of effective access permissions without the IAM system receiving a request for accessing the first system resource set or the second system resource set of the IAM system.

20. The non-transitory computer-readable medium of claim 19, wherein the operations further comprise:
identifying a third policy statement, wherein the third policy statement specifies that members of a third identity set are denied access to a third system resource set of the IAM system;

determining whether or not there is a shared system resource belonging to both the first system resource set and the third system resource set, and whether or not the third identity set includes the principal;

determining that the third policy statement does not overlap with the first policy statement for the principal when there is no shared system resource that belongs to the first system resource set and the third system resource set, or the third identity set does not include the principal, wherein the third policy statement is not placed on the list of policy statements associated with the first policy statement.

* * * * *